(12) United States Patent
Mouard et al.

(10) Patent No.: US 9,389,104 B2
(45) Date of Patent: Jul. 12, 2016

(54) LIGHT-GUIDE DEVICE HAVING A PLURALITY OF LIGHT-GUIDE ELEMENTS FOR A VEHICLE CONTROL PANEL

(71) Applicant: Magneti Marelli S.p.A., Corbetta (IT)

(72) Inventors: Sylvain Mouard, Magenta (IT); Luca Masala, Novara (IT); Andrea Ramella, Palestro (IT)

(73) Assignee: Magneti Marelli S.p.A., Corbetta (IT)

( * ) Notice: Subject to any disclaimer, the term of this patent is extended or adjusted under 35 U.S.C. 154(b) by 36 days.

(21) Appl. No.: 13/960,257

(22) Filed: Aug. 6, 2013

(65) Prior Publication Data

US 2014/0160721 A1 Jun. 12, 2014

(30) Foreign Application Priority Data

Aug. 6, 2012 (IT) .............................. TO2012A0707

(51) Int. Cl.
*G02B 6/10* (2006.01)
*G01D 13/00* (2006.01)
*B60K 37/02* (2006.01)
*G01D 11/28* (2006.01)

(52) U.S. Cl.
CPC ............... *G01D 13/00* (2013.01); *B60K 37/02* (2013.01); *G01D 11/28* (2013.01); *B60K 2350/203* (2013.01); *B60K 2350/402* (2013.01)

(58) Field of Classification Search
CPC .. G02B 6/0011; G02B 6/0073; G02B 6/0078; F21V 2200/20; H01H 9/161; H01H 9/182
See application file for complete search history.

(56) References Cited

U.S. PATENT DOCUMENTS

| | | | | |
|---|---|---|---|---|
| 5,268,823 A | * | 12/1993 | Yergenson | 362/26 |
| 5,327,328 A | * | 7/1994 | Simms et al. | 362/26 |
| 5,504,660 A | * | 4/1996 | Heidorn | 362/27 |
| 5,874,901 A | * | 2/1999 | Ohyama | 362/26 |
| 5,876,239 A | * | 3/1999 | Morin et al. | 439/490 |
| 5,938,324 A | * | 8/1999 | Salmon et al. | 362/555 |
| 7,329,034 B2 | * | 2/2008 | Verdes et al. | 362/555 |
| 7,598,885 B2 | * | 10/2009 | Kwon et al. | 362/27 |
| 7,837,344 B2 | * | 11/2010 | Altonen et al. | 362/27 |
| 7,891,855 B2 | * | 2/2011 | Yang | 362/616 |
| 8,178,802 B2 | * | 5/2012 | Roose et al. | 200/296 |
| 8,267,562 B2 | * | 9/2012 | Biedrzycki et al. | 362/602 |
| 8,950,882 B2 | * | 2/2015 | Park | 362/23.16 |
| 2002/0090193 A1 | | 7/2002 | Schechtel et al. | |

FOREIGN PATENT DOCUMENTS

| | | |
|---|---|---|
| EP | 1 843 180 A1 | 10/2007 |
| WO | 2006041876 A1 | 4/2006 |
| WO | 2011144484 A1 | 11/2011 |

OTHER PUBLICATIONS

Italian Search Report IT TO20120707 dated Jan. 30, 2013.
European Search Report EP 13 17 9497.6 dated Sep. 26, 2013.

* cited by examiner

*Primary Examiner* — Ismael Negron
(74) *Attorney, Agent, or Firm* — Howard & Howard Attorneys PLLC

(57) ABSTRACT

A light-guide device has a single piece body including a plurality of light guiding elements joined together by at least one supporting element. An opaque coating is provided on an outer surface of the at least one supporting element, to absorb the light entering into the supporting element from the light-guide elements.

7 Claims, 3 Drawing Sheets

LIGHT-GUIDE DEVICE HAVING A PLURALITY OF LIGHT-GUIDE ELEMENTS FOR A VEHICLE CONTROL PANEL

REFERENCE TO RELATED APPLICATION

This application is based upon and claims priority to Italian Patent Application BO2012A 00070 filed on Aug. 6, 2012.

BACKGROUND OF INVENTION

1. Field of Invention

The present invention relates to a light-guide device designed to light a plurality of indicators in a vehicle control panel. In particular, the present invention relates to a light-guide device of an instrument panel in a motor vehicle or motorcycle.

2. Description of Related Art

As known, vehicles have an instrument panel provided with a plurality of indicators, which are defined by graduated scales, warning lights, numbers, etc. and are lighted and/or turned off for providing information about the operation of devices and/or the activation/deactivation of vehicle functions.

Each of such indicators receives light from a corresponding light source independently of the other indicators. The light sources are usually arranged in a position spaced apart from the indicators for optimizing the space available in the instrument panel. The various light beams are transmitted to the respective indicators in a direct manner, through reflections, or through light-guide elements, which are defined by separate pieces spaced apart from one another.

In this latter case, the light-guide elements may be relatively numerous, according to the application, and they are made substantially equal in shape and size for reducing costs. However, since they are separate pieces, they still require a long mounting time when assembling the instrument panel and a long time for the quality control of the instrument panel itself.

WO2006041876A1 describes a control panel for a vehicle compartment. Such an instrument panel has a plurality of light-guide fingers that are connected to a lens, at an upper edge of such a lens, close to respective indicators directly provided into the lens. The light-guide fingers transfer light from a light source into the lens edge in order to light the indicators.

Such indicators may be functionally separate in order to reduce the amount of light that the lens transmits from each one indicator to the adjacent ones. However, the modes indicated in WO2006041876A1 for reducing the light leaking through the lens are not satisfactory.

SUMMARY OF THE INVENTION

It is the object of the present invention to provide a light-guide device designed to light a plurality of indicators in a vehicle control panel, which allows the above problem to be solved in a simple and cost-effective manner.

Accordingly, the present invention is directed toward a light-guide device including a body made as a single piece and having a plurality of light-guide elements. Each of the light-guide elements includes respective lighting portions for lighting respective indicators in a control panel and respective transmission portions for guiding respective light beams toward the lighting portions. In addition, the body also includes at least one supporting element which joins the light guide elements to one another. An opaque coating adheres onto the outer surface 25 of the support element and acts to absorb the light exiting, in use, from the light-guide elements in the supporting element so as to prevent light transmission in said supporting element from each of the light guide elements to the adjacent light-guide elements.

In addition, the present invention is also directed toward a control panel including a plurality of light indicators, a plurality of light sources, and a light guide device that acts to transmit independent light beams from the light sources to the indicators, respectively.

BRIEF DESCRIPTION OF THE DRAWINGS

The invention will now be described with reference to the accompanying drawings, which show a non-limiting embodiment thereof, in which.

DETAILED DESCRIPTION OF THE INVENTION

Figure 1:
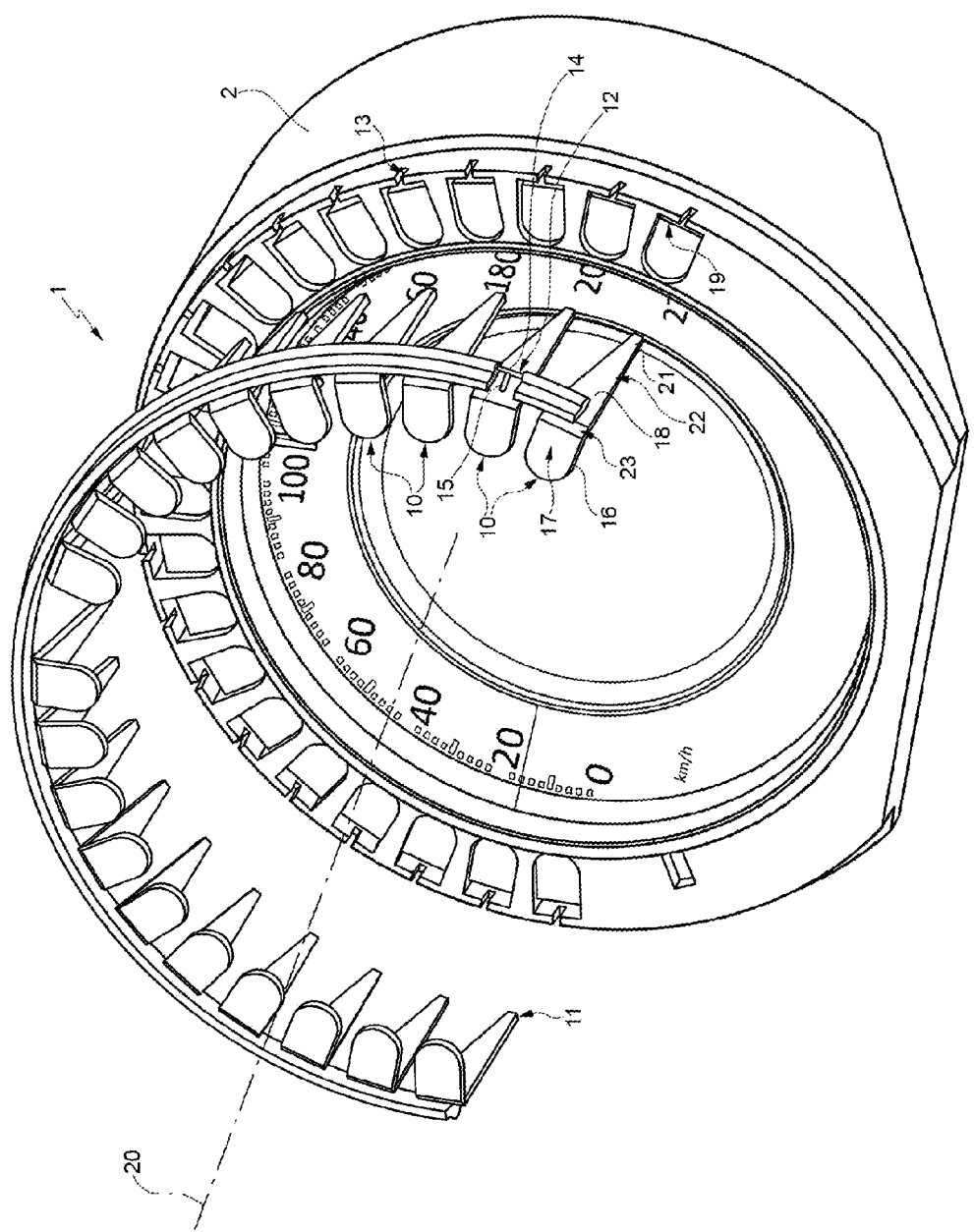
FIG. 1 is a partial perspective view which shows, when assembling a control panel, a preferred embodiment of the light-guide device according to the present invention.

In FIG. 1, reference numeral 1 indicates, as a whole, a light-guide device (partially shown) belonging to a control panel 2, in particular an instrument panel of a vehicle.

Figure 2:
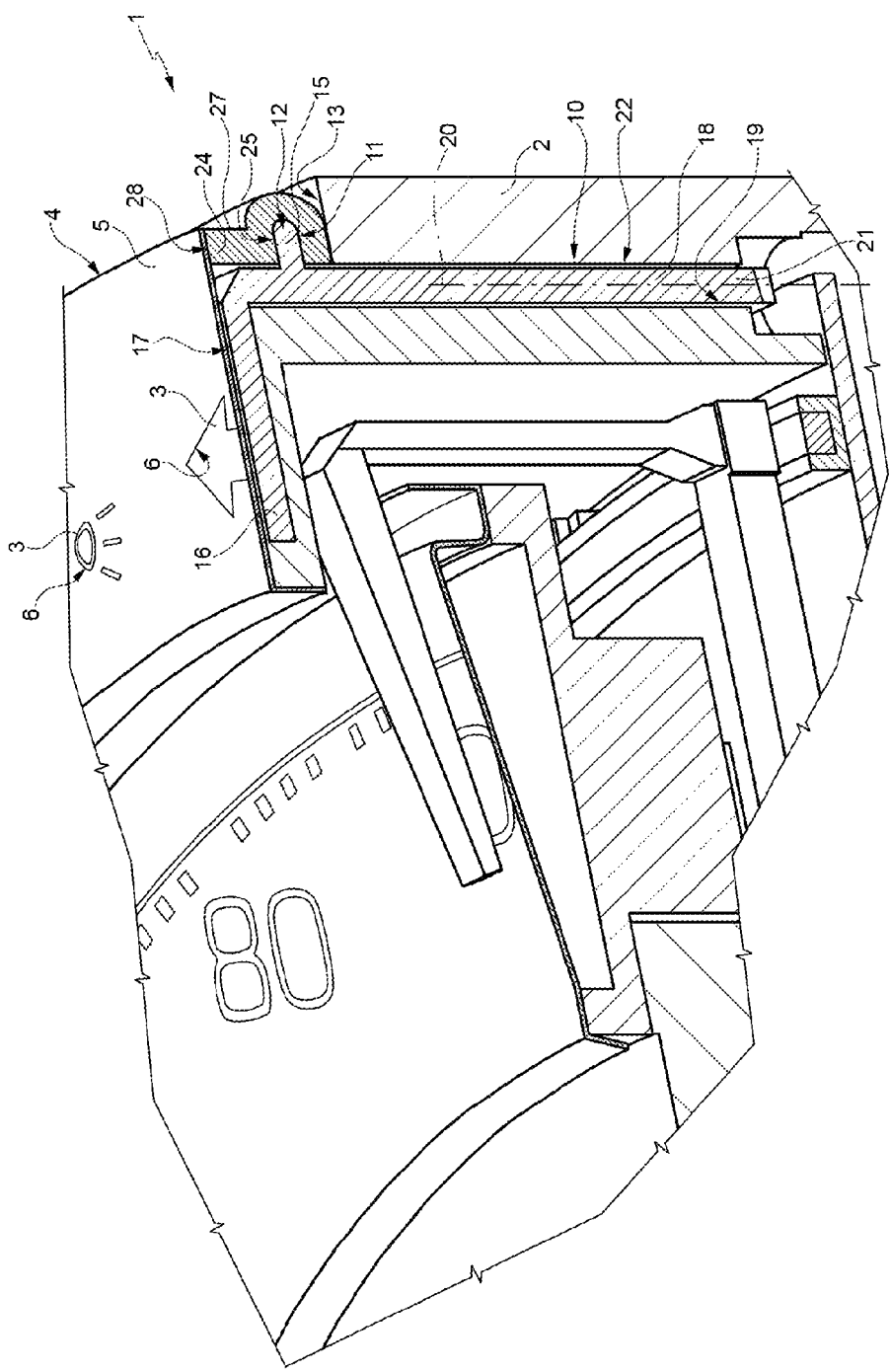
FIG. 2 is an enlarged scale, sectional view of a detail of the control panel in FIG. 1.

As seen in FIG. 2, the control panel 2 includes a plurality of indicators 3, which are defined by warning lights, graduated scales, numbers, etc. for providing information about the operation of respective devices and/or about the activation/deactivation of respective operating functions. In particular, a part of indicators 3 is carried by a plate 4, which substantially extends with a circle arc shape about the rotation axis of a finger. Plate 4 comprises an opaque main portion 5, i.e. non-permeable to light or light-blocking, and a plurality of windows 6, which are made of a light permeable material or as through openings in portion 5 and have a profile shaped so as to define the above indicators 3.

The control panel 2 further includes a plurality of light sources (not shown in the accompanying figures), each of which provides a light beam for lighting a corresponding indicator 3. The light beams are transmitted to indicators 3 independently of one another by respective light-guide elements 10, which form a part of the light-guide device 1.

With reference to FIG. 1, in particular, the light-guide device 1 includes a body 11, which is made as a single piece of a transparent light-guide material of a known type (e.g. by injection molding of a plastic material) and consists of the light-guide elements 10 and of at least one supporting element 12 which connects the light-guide elements 10 to one another. The supporting element 12 is connected to all the light-guide elements 10, whereby the latter are arranged in parallel with respect to the supporting element 12. The supporting element 12 is accommodated in a seat 13 of the control panel 2 and includes a rod or rail 14 spaced apart from the light-guide elements 10, and a plurality of jumpers 15, which are spaced apart from one another along rail 14, protrude from rail 14 and have, each, an end joined to a corresponding light-guide element 10.

The light-guide elements 10 are preferably equal to one another and includes respective lighting end portions 16, which are defined by respective plates having a flat surface 17 facing the indicators 3. Preferably, surfaces 17 are coplanar and plate 4 rests on the surfaces 17 (FIG. 2).

The light-guide elements 10 further includes respective transmission portions 18 which are accommodated into respective seats 19 of the control panel 2 and extend parallel to a direction 20, orthogonal to portions 16 and to plate 4 and corresponding to the direction in which device 1 is mounted in the remaining part of the control panel 2 during the assembly operation.

Each portion 18 has a free end 21, which receives in use the light beam from the corresponding light source, and a back surface 22 from which the corresponding jumper 15 protrudes. Surfaces 17 and 22 are joined by means of a surface 23, which is calculated from the optical point of view so as to contribute to diverting the light from portion 18 to portion 16. For example, surface 23 is a chamfer at 45°.

As shown in FIG. 2, the light-guide device 1 further includes a coating 24 which is made of an opaque or light-absorbing material (e.g. black colored, if the light-guide elements 10 must transmit white light; red colored, if the light-guide elements 10 must transmit blue light; etc.), is arranged on at least part of the supporting element 12 so as to absorb the light entering into jumpers 15 from the light-guide elements 10 and thus prevent the transmission of such a light to the adjacent light-guide elements 10.

It is important to have a sufficient adhesion of coating 24 on the outer surface 25 of the supporting element 12, so as not to have any discontinuity or gap between the two materials (similarly to what substantially happens for a welding). Thereby, on the contrary, a possible detachment of the material of coating 24 from surface 25 would make the transparent material of the supporting element 12 work as a light-guide.

It is therefore important to select the materials of body 10 and of coating 24 so that they are chemically compatible so as to ensure a perfect adhesion. For example: polycarbonate (PC) and ABS are chemically compatible, whereby they substantially weld to each other. On the contrary, polycarbonate (PC) and polymethylmethacrylate (PMMA) are not compatible, whereby they tend to detach from each other.

Coating 24 is preferably formed by co-molding the selected material on body 11. According to an alternative, coating 24 is formed by painting the selected material on surface 25.

Coating 24 entirely covers the rail 14 and preferably the jumpers 15 as well, so as to substantially contact the surfaces 22.

In the specific case described, coating 24 includes a leg 27, which protrudes with respect to rail 14 so as to have a face 28 coplanar with the surfaces 17.

According to a preferred embodiment, surface 25 is embossed. The embossing between the transparent material of the supporting element 12 and the opaque material of coating 24 tends to increase the light absorption by coating 24, as it increases the extension of surface 25. In particular, the embossing is directly formed when molding body 11.

As mentioned above, a small part of the light beam exits from portion 18 and enters into the supporting element 12, whereby it does not reach the indicator 3 to be lighted, thus causing a loss of light power compared to that emitted by the light source.

Such a loss is made negligible by minimizing the cross section of jumpers 15 in relation to the cross section of portions 18, and by placing jumper 15 in a zone in which the light arrives indirectly, through reflection, and not directly along the direction of the light beam guided by portion 18.

The amount of light absorbed by coating 24 also depends on the length of the light path in the "absorbing" or "opacified" zone between two consecutive light-guide elements 10: the longer such a path is, the more valid the result becomes, even for relatively high amounts of light entering into jumpers 15.

Figure 3:
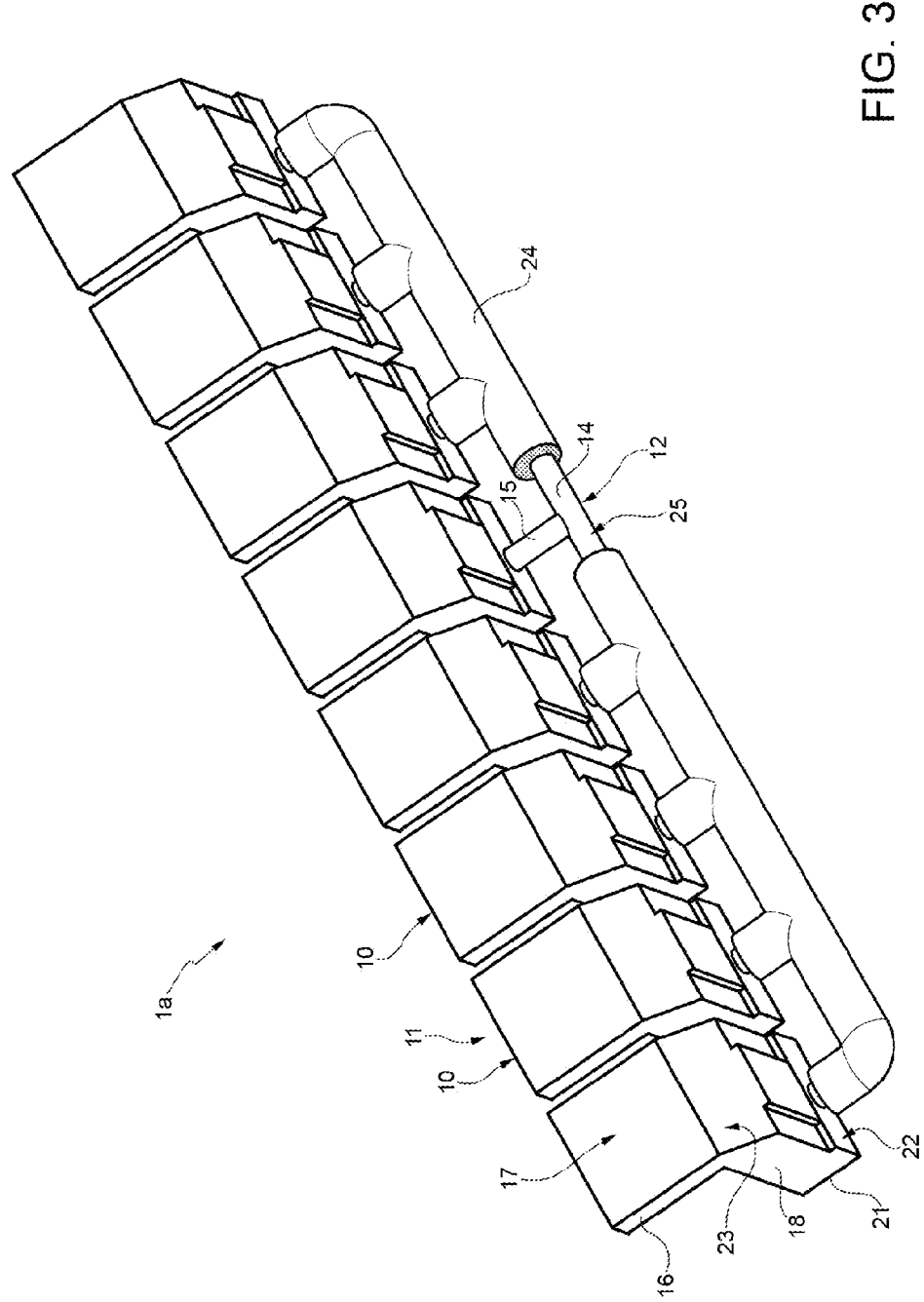
FIG. 3 is a variant of the light-guide device of FIG. 1.

FIG. 3 shows a variant of the light-guide device, denoted by reference numeral 1*a*, wherein the various parts are indicated, where possible, by the same reference numerals used in FIG. 1. Such parts usually have a different shape from those of the light-guide device 1 in FIG. 1. In particular, rail 14 is rectilinear rather than curved; and portions 18 have a greater cross section.

According to another variant, the supporting element 12 is replaced by a plurality of separate jumpers defining, each, a bond between two consecutive light-guide elements 10. The outer surface of all jumpers is then covered by respective coatings 24. Thereby, the light-guide elements 10 are connected in series to one another by such jumpers, where the light is absorbed in order to prevent it from passing to the next light-guide element 10.

It is apparent from the above that the light-guide device 1 is a component which may be mounted in a single operation when assembling the control panel 2, whereby the time required for such an assembly operation and for the quality control of the control panel 2 is much shorter than the known solutions.

The operation of device 1 is however efficient as the transmission quality of the light beams and thus the quality of the light indication of the information by the control panel 2 are not affected.

Moreover, device 1 is relatively simple to be manufactured, because it requires a single molding operation to form the body 10, rather than including a molding operation to separately form each of the light-guide elements 10.

Moreover, other advantages become apparent from the above-described features.

Finally, it is apparent that changes and variations may be made to the light-guide device 1 described with reference to the accompanying figures, without departing from the scope of protection of the present invention, as defined in the appended claims.

In particular, rather than defining an instrument panel, the control panel 2 could belong to an electronic device of the vehicle, such as a satellite navigator, a radio, etc. and/or indicators 3 could be associated with a display, such as an active matrix display.

It should be appreciated by those having ordinary skill in the related art that the light guide device has been described above in an illustrative manner. Moreover, the terminology that has been used herein is intended to be in the nature of words of description rather than of limitation. Thus, many modifications and variations of the light guide device are possible in light of the above teachings. It should also be appreciated that, within the scope of the appended claims, the invention may be practiced other than as specifically described above.

What is claimed is:

1. A light-guide device, comprising:
   a body made as a single piece of transparent material and including a plurality of light-guide elements having respective lighting portions for lighting respective indicators in a control panel, and respective transmission portions for guiding respective light beams towards said lighting portions;
   said body including at least one supporting element which has a transparent outer surface and joins said light-guide elements to one another; and
   an opaque coating which adheres only and directly onto said transparent outer surface of said supporting element so as to absorb the light exiting, in use, from said light-guide elements in said supporting element so as to prevent the light transmission in said supporting element from each said light-guide element to the adjacent light-guide elements.

2. The light-guide device as set forth in claim 1, wherein said outer surface is embossed.

3. The light-guide device as set forth in claim 1, wherein said at least one supporting element is defined by a single supporting element, which consists of a single rail and of a plurality of jumpers, each one joining a corresponding said transmission portion to said rail.

4. The light-guide device as set forth in claim 1, wherein said body includes said light-guide elements and a plurality of supporting elements, each of which joins two adjacent light-guide elements and is coated by said opaque coating.

5. The light-guide device as set forth in claim 1, wherein said plurality of light-guide elements are arranged parallel to one another along the longitudinal direction of said supporting element, and wherein each of the lighting portions and the transmission portions define, generally, an L shape such that the transmission portions extend orthogonal to said lighting portions.

6. A light-guide device as set forth in claim 5, wherein each light-guide element includes an angled surface extending at an angle to, and between said transmission portion and said lighting portion.

7. A light-guide device as set forth in claim 6, wherein said angled surface defines a chamfer extending at an angle of 45° relative to said lighting portion and said transmission portion.

* * * * *